US012494184B2

(12) United States Patent
Chen et al.

(10) Patent No.: US 12,494,184 B2
(45) **Date of Patent: *Dec. 9, 2025**

(54) DISPLAY DRIVING METHOD, DISPLAY DRIVING DEVICE, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Dongchuan Chen, Beijing (CN); Yanping Liao, Beijing (CN); Yingmeng Miao, Beijing (CN); Yinlong Zhang, Beijing (CN); Shulin Yao, Beijing (CN); Xibin Shao, Beijing (CN); Seungmin Lee, Beijing (CN); Jiantao Liu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,531

(22) Filed: Apr. 15, 2024

(65) Prior Publication Data

US 2024/0257778 A1 Aug. 1, 2024

Related U.S. Application Data

(63) Continuation of application No. 17/633,008, filed as application No. PCT/CN2021/086200 on Apr. 9, 2021, now Pat. No. 12,014,695.

(51) Int. Cl.
*G09G 3/36* (2006.01)

(52) U.S. Cl.
CPC ... *G09G 3/3614* (2013.01); *G09G 2310/0205* (2013.01); *G09G 2310/0213* (2013.01);
(Continued)

(58) Field of Classification Search
CPC ......... G09G 3/3614; G09G 2310/0205; G09G 2320/0257; G09G 2310/025;
(Continued)

(56) References Cited

U.S. PATENT DOCUMENTS

2011/0273439 A1* 11/2011 Son ........................ G09G 3/003 345/419
2012/0092241 A1* 4/2012 Shang .................. G09G 3/3648 345/87
2014/0168281 A1 6/2014 Ahn et al.
2014/0320521 A1* 10/2014 Oh ....................... G09G 3/3648 345/601

(Continued)

FOREIGN PATENT DOCUMENTS

CN 112017575 A 12/2020

OTHER PUBLICATIONS

Non-Office Action in related U.S. Appl. No. 17/633,008, dated Sep. 15, 2023.

(Continued)

*Primary Examiner* — Xuemei Zheng
(74) *Attorney, Agent, or Firm* — LEASON ELLIS LLP

(57) ABSTRACT

A display driving method, a display driving device and a display device are provided. The display driving method includes: when displaying an odd-numbered frame, providing first parity row data of the odd-numbered frame to a display array, to enable a third parity row of the display array to be displayed based on real data of the first parity row data and enable a fourth parity row of the display array to be displayed based on interpolation data of the first parity row data; and when displaying an even-numbered frame, providing second parity row data of the even-numbered frame to the display array, to enable the fourth parity row of the (Continued)

display array to be displayed based on real data of the second parity row data and enable the third parity row of the display array to be displayed based on interpolation data of the second parity row data.

14 Claims, 6 Drawing Sheets

(52) U.S. Cl.
CPC . *G09G 2310/0251* (2013.01); *G09G 2310/08* (2013.01); *G09G 2320/0257* (2013.01); *G09G 2340/0435* (2013.01)

(58) Field of Classification Search
CPC ... G09G 2310/0213; G09G 2310/0251; G09G 2310/08
See application file for complete search history.

(56) References Cited

U.S. PATENT DOCUMENTS

| | | | | |
|---|---|---|---|---|
| 2015/0035866 | A1* | 2/2015 | Ahn | G09G 3/3648 345/690 |
| 2016/0155405 | A1* | 6/2016 | Kim | G09G 3/003 345/88 |
| 2016/0180789 | A1* | 6/2016 | Hur | G09G 3/3614 345/100 |
| 2017/0243557 | A1 | 8/2017 | Yoon et al. | |

OTHER PUBLICATIONS

Extended European search report for European Application No. 21935593.0, dated Nov. 29, 2023.
Notice of Allowance in related U.S. Appl. No. 17/633,008, dated Feb. 14, 2024.

* cited by examiner

DISPLAY DRIVING METHOD, DISPLAY DRIVING DEVICE, AND DISPLAY DEVICE

This application is a continuation application of U.S. Ser. No. 17/633,008, filed on Feb. 4, 2022, which is a U.S. National Phase Entry of International Application No. PCT/CN2021/086200 field on Apr. 9, 2021. The above-identified applications are incorporated by reference herein in their entirety.

TECHNICAL FIELD

The embodiments of the present disclosure relate to a display driving method, a display driving device, and a display device.

BACKGROUND

A resolution and a refresh rate are two important parameters used to characterize the performance of a display. On one hand, the higher the resolution of the display, the finer the picture displayed; on the other hand, the higher the refresh rate of the display, the more fluent the picture displayed. With the development of display technology, the resolution of the display continues to increase. For example, displays with various resolutions such as: HD (High Definition), FHD (Full High Definition), UHD (Ultra High Definition), 5K (refers to the line resolution in the display), 8K (refers to the line resolution in the display), etc. have emerged. At the same time, the refresh rate of the display has also been continuously improved. For example, displays with various refresh rates such as: 60 Hz, 120 Hz, 144 Hz, 165 Hz, 240 Hz, etc. have appeared; thus, a better visual experience can be provided for users, especially game players.

SUMMARY

At least some embodiments of the present disclosure disclose a display driving method, comprising: when displaying an odd-numbered frame, providing first parity row data of the odd-numbered frame to a display array, to enable a third parity row of the display array to be displayed based on real data of the first parity row data and enable a fourth parity row of the display array to be displayed based on interpolation data of the first parity row data; and when displaying an even-numbered frame, providing second parity row data of the even-numbered frame to the display array, to enable the fourth parity row of the display array to be displayed based on real data of the second parity row data and enable the third parity row of the display array to be displayed based on interpolation data of the second parity row data, any row of the display array has a two-row charging duration before displaying; in a case where the any row of the display array displays based on real data, the two-row charging duration of the any row is used to charge the any row according to the real data corresponding to the any row; in a case where the any row of the display array displays based on interpolation data, a next-row charging duration of the two-row charging duration of the any row is used to charge the any row according to real data corresponding to an adjacent row of the any row, a previous-row charging duration of the two-row charging duration of the any row is used to charge the any row according to real data corresponding to another adjacent row of the any row or is not used to charge the any row; the first parity row data is one of odd-numbered row data and even-numbered row data, and the second parity row data is the other of the odd-numbered row data and the even-numbered row data; and the third parity row is one of an odd-numbered row and an even-numbered row, and the fourth parity row is the other of the odd-numbered row and the even-numbered row.

For example, the display driving method provided by some embodiments of the present disclosure, further comprises: when displaying a plurality of frames, periodically changing a data polarity of each frame, the data polarity comprises a first polarity and a second polarity, and the first polarity is opposite to the second polarity.

For example, in the display driving method provided by some embodiments of the present disclosure, a first minimum change period of the data polarity of each frame is 2 frames; and in the first minimum change period, a data polarity of one frame of the 2 frames is the first polarity, and a data polarity of the other frame of the 2 frames is the second polarity.

For example, in the display driving method provided by some embodiments of the present disclosure, a first minimum change period of the data polarity of each frame is 4n frames, and n is a positive integer greater than or equal to 1; and in the first minimum change period, data polarities of n odd-numbered frame(s) and n even-numbered frame(s) are the first polarity, and data polarities of remaining n odd-numbered frame(s) and remaining n even-numbered frame (s) are the second polarity.

For example, in the display driving method provided by some embodiments of the present disclosure, n is equal to 1 or n is equal to 2.

For example, the display driving method provided by some embodiments of the present disclosure, further comprises: when displaying the plurality of frames, periodically changing a data mapping relationship of each frame, so that within a minimum common period of the data polarity and the data mapping relationship of each frame, each type of data mapping relationship corresponds to both the first polarity and the second polarity.

For example, in the display driving method provided by some embodiments of the present disclosure, in the minimum common period, a count of data mapping relationships, corresponding to the first polarity is equal to a count of data mapping relationships, corresponding to the second polarity.

For example, in the display driving method provided by some embodiments of the present disclosure, the data mapping relationship comprises at least one selected from a group consisting of a first data mapping relationship, a second data mapping relationship, a third data mapping relationship, and a fourth data mapping relationship; the first data mapping relationship comprises: odd-numbered rows of the display array correspond to display real data of odd-numbered row data of one frame, and even-numbered rows of the display array correspond to display interpolation data of the odd-numbered row data of the one frame; the second data mapping relationship comprises: odd-numbered rows of the display array correspond to display real data of even-numbered row data of one frame, and even-numbered rows of the display array correspond to display interpolation data of the even-numbered row data of the one frame; the third data mapping relationship comprises: even-numbered rows of the display array correspond to display real data of odd-numbered row data of one frame, and odd-numbered rows of the display array correspond to display interpolation data of the odd-numbered row data of the one frame; and the fourth data mapping relationship comprises: even-numbered rows of the display array correspond to display real data of even-numbered row data of one frame, and odd-numbered rows of the display array correspond to display interpolation data of the even-numbered row data of the one frame.

For example, in the display driving method provided by some embodiments of the present disclosure, a second minimum change period of each frame of data mapping relationship is 4 frames, the display driving method comprises: when displaying an (x1)-th frame in the second minimum change period, providing odd-numbered row data of the (x1)-th frame to the display array, so that the display array displays according to the first data mapping relationship; when displaying an (x2)-th frame in the second minimum change period, providing even-numbered row data of the (x2)-th frame to the display array, so that the display array displays according to the second data mapping relationship; when displaying an (x3)-th frame in the second minimum change period, providing odd-numbered row data of the (x3)-th frame to the display array, so that the display array displays according to the third data mapping relationship; when displaying an (x4)-th frame in the second minimum change period, providing even-numbered row data of the (x4)-th frame to the display array, so that the display array displays according to the fourth data mapping relationship; a group {x1, x2, x3, x4} is identical to a group {1, 2, 3, 4}.

For example, in the display driving method provided by some embodiments of the present disclosure, any row of the display array further has at least one-row pre-charging duration before displaying, and the at least one-row pre-charging duration is before the two-row charging duration.

At least some embodiments of the present disclosure further disclose a display driving device, comprising: a first driver and a second driver; the first driver is configured to: when displaying an odd-numbered frame, provide first parity row data of the odd-numbered frame to a display array, and when displaying an even-numbered frame, provide second parity row data of the even-numbered frame to the display array; the second driver is configured to: when displaying the odd-numbered frame, enable a third parity row of the display array to be displayed based on real data of the first parity row data and enable a fourth parity row of the display array to be displayed based on interpolation data of the first parity row data; and when displaying the even-numbered frame, enable the fourth parity row of the display array to be displayed based on real data of the second parity row data and enable the third parity row of the display array to be displayed based on interpolation data of the second parity row data; the first driver and the second driver are further configured to: enable any row of the display array have a two-row charging duration before displaying; in a case where the any row of the display array displays based on real data, enable the two-row charging duration of the any row to be used to charge the any row according to the real data corresponding to the any row; in a case where the any row of the display array displays based on interpolation data, enable a next-row charging duration of the two-row charging duration of the any row to be used to charge the any row according to real data corresponding to an adjacent row of the any row and enable a previous-row charging duration of the two-row charging duration of the any row to be used to charge the any row according to real data corresponding to another adjacent row of the any row or be not used to charge the any row; the first parity row data is one of odd-numbered row data and even-numbered row data, and the second parity row data is the other of the odd-numbered row data and the even-numbered row data; and the third parity row is one of an odd-numbered row and an even-numbered row, and the fourth parity row is the other of the odd-numbered row and the even-numbered row.

For example, in the display driving device provided by some embodiments of the present disclosure, the first driver is further configured to: when displaying a plurality of frames, periodically change a data polarity of each frame; the data polarity comprises a first polarity and a second polarity, and the first polarity is opposite to the second polarity.

For example, in the display driving device provided by some embodiments of the present disclosure, a first minimum change period of the data polarity of each frame is 4n frames, and n is a positive integer greater than or equal to 1; and in the first minimum change period, data polarities of n odd-numbered frame(s) and n even-numbered frame(s) are the first polarity, and data polarities of remaining n odd-numbered frame(s) and remaining n even-numbered frame (s) are the second polarity.

For example, in the display driving device provided by some embodiments of the present disclosure, the second driver is further configured to: when displaying the plurality of frames, periodically change a data mapping relationship of each frame, so that within a minimum common period of the data polarity and the data mapping relationship of each frame, each type of data mapping relationship corresponds to both the first polarity and the second polarity.

For example, in the display driving device provided by some embodiments of the present disclosure, in the minimum common period, a count of data mapping relationships, corresponding to the first polarity, is equal to a count of data mapping relationships, corresponding to the second polarity.

For example, in the display driving device provided by some embodiments of the present disclosure, the data mapping relationship comprises at least one selected from a group consisting of a first data mapping relationship, a second data mapping relationship, a third data mapping relationship, and a fourth data mapping relationship; the first data mapping relationship comprises: odd-numbered rows of the display array correspondingly displaying real data of odd-numbered row data of one frame, and even-numbered rows of the display array correspondingly displaying interpolation data of the odd-numbered row data of the one frame; the second data mapping relationship comprises: odd-numbered rows of the display array correspondingly displaying real data of even-numbered row data of one frame, and even-numbered rows of the display array correspondingly displaying interpolation data of the even-numbered row data of the one frame; the third data mapping relationship comprises: even-numbered rows of the display array correspondingly displaying real data of odd-numbered row data of one frame, and odd-numbered rows of the display array correspondingly displaying interpolation data of the odd-numbered row data of the one frame; and the fourth data mapping relationship comprises: even-numbered rows of the display array correspondingly displaying real data of even-numbered row data of one frame, and odd-numbered rows of the display array correspondingly displaying interpolation data of the even-numbered row data of the one frame.

For example, in the display driving device provided by some embodiments of the present disclosure, a second minimum change period of each frame of data mapping relationship is 4 frames, the first driver is configured to: when displaying an (x1)-th frame in the second minimum change period, provide odd-numbered row data of the (x1)-th frame to the display array; when displaying an (x2)-th frame in the second minimum change period, provide even-numbered row data of the (x2)-th frame to the display array; when displaying an (x3)-th frame in the second minimum change period, provide odd-numbered row data of the (x3)-th frame to the display array; when displaying an (x4)-th frame in the second minimum change period, provide even-numbered row data of the (x4)-th frame to the display array; the second driver is configured to: when displaying the (x1)-th frame in the second minimum change period, enable the display array to be displayed according to the first data mapping relationship; when displaying the (x2)-th frame in the second minimum change period, enable the display array to be displayed according to the second data mapping relationship; when displaying the (x3)-th frame in the second minimum change period, enable the display array to be displayed according to the third data mapping relationship; when displaying the (x4)-th frame in the second minimum change period, enable the display array to be displayed according to the fourth data mapping relationship; a group {x1, x2, x3, x4} is identical to a group {1, 2, 3, 4}.

For example, in the display driving device provided by some embodiments of the present disclosure, the second driver is further configured to: enable any row of the display array to have at least one-row pre-charging duration before displaying; and the at least one-row pre-charging duration is before the two-row charging duration.

For example, in the display driving device provided by some embodiments of the present disclosure, the first driver comprises a data driver, and the second driver comprises a gate driver.

At least some embodiments of the present disclosure also provide a display device comprising the display driving device provided by any embodiment of the present disclosure.

For example, in the display device provided by some embodiments of the present disclosure, the display device is a liquid crystal display device.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
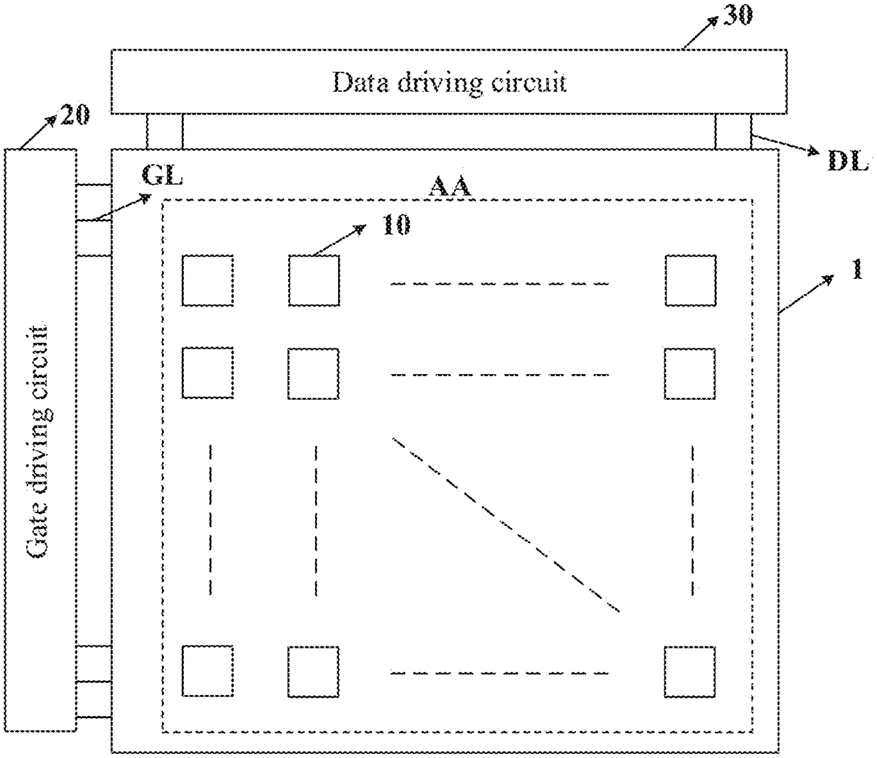
FIG. 1 is a schematic diagram of a structure of a display device.

FIG. 1 is a schematic diagram of a structure of a display device. As shown in FIG. 1, the display device comprises a display panel 1, the display panel 1 comprises a display region AA, a pixel array is arranged in the display region AA, and the pixel array comprises a plurality of sub-pixels 10 arranged in an array. For example, the display panel 1 may be a liquid crystal display panel, that is, the display device is a liquid crystal display device, but the present disclosure is not limited thereto. For example, the plurality of sub-pixels 10 usually include sub-pixels with a plurality of colors, the sub-pixels with the plurality of colors generally include sub-pixels with a first color, sub-pixels with a second color, and sub-pixels with a third color. For example, the first color, the second color, and the third color may be three primary colors (for example, red, green, and blue etc.), but the present disclosure is not limited to this case. For ease of description, the plurality of sub-pixels 10 in FIG. 1 are arranged in a matrix form as an example for description. In this case, the sub-pixels 10 arranged in one row in a horizontal direction are referred to as a row of sub-pixels, and the sub-pixels 10 arranged in one row in a vertical direction are referred to as a column of sub-pixels.

For example, as shown in FIG. 1, the display device further includes a gate driving circuit 20 (also referred to as "scan drive circuit", "gate driver") and a data driving circuit 30 (also referred to as "source drive circuit", "data driver"). The gate driving circuit 20 is used to provide gate signals to the pixel array, the data driving circuit 30 is used to provide data signals to the pixel array, and the pixel array performs display under the coordinated control of the gate signals and the data signals. For example, as shown in FIG. 1, the gate driving circuit 20 is electrically connected to the pixel array through gate lines GL, and the data driving circuit 30 is electrically connected to the pixel array through data lines DL. For example, the gate driving circuit 20 can be achieved by a bonded integrated circuit driving chip, or the gate driving circuit 20 can be directly integrated on the display panel 1 to form a GOA (Gate driver On Array); for example, the data driving circuit 30 can be implemented by a bonded integrated circuit driving chip. Hereinafter, a case that the gate driving circuit 20 is implemented as a GOA is taken as an example to illustrate the present disclosure, but it should not be regarded as a limitation to the present disclosure.

It should be noted that FIG. 1 is exemplary. A gate driving circuit is provided on a single side of the display panel 1, and respective gate lines are driven row by row from the single side, that is, single-side driving. For example, gate driving circuits can also be respectively provided on both sides of the display panel 1 along an extending direction of the gate lines, and the respective gate lines are driven row by row from both sides at the same time through the two gate driving circuits, that is, double-side driving. For example, gate driving circuits can also be respectively provided on both sides of the display panel 1 along an extending direction of the gate lines, and the two gate driving circuits alternately drive the respective gate lines row by row from both sides, that is, cross driving. It should be noted that the present disclosure is described by taking single-side driving as an example, but it should not be regarded as a limitation to the present disclosure.

Figure 2:
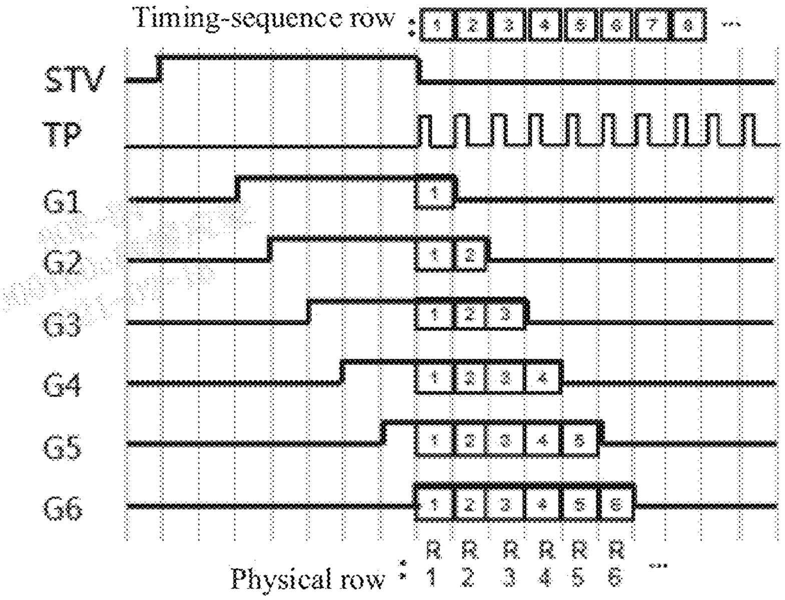
FIG. 2 is a charging timing-sequence diagram of a GOA.

FIG. 2 is a charging timing-sequence diagram of a GOA. As shown in FIG. 2, for a liquid crystal display panel, in order to light up the sub-pixels 10 in the display region AA, a frame start signal STV is required to trigger the GOA to output gate signals row by row to turn on gate electrodes in the sub-pixels 10, and at the same time, a data transmission control signal TP (referred to as "TP signal") triggers the data driving circuit 30 to output data signals, so that one row of data can be written into the sub-pixels 10 to achieve to light up the sub-pixels 10 in one row. As shown in FIG. 2, the timing-sequence row data 1, 2, 3, 4, . . . represent the first, second, third, fourth, . . . row data loaded in the data driving circuit 30, in response to the TP signal, the data loaded in the data driving circuit 30 can be output to the data lines; the physical row data represents the data charged into the sub-pixels. In the charging timing shown in FIG. 2, the physical row data and the timing-sequence row data correspond one-to-one, and the number of the physical row data and the number of the timing-sequence row data are the same.

As shown in FIG. 2, the gate signals output by the GOA all last for a plurality rows of durations (the duration interval between two adjacent gray vertical lines in FIG. 2 represents one-row duration), among them, the first few rows of duration is used to pre-charge the data in the previous rows, and only the last row of duration is used to charge the data in this row. Exemplarily, as shown in FIG. 2, the effective level of the gate signal of each row of the GOA lasts for 6 rows of durations, the first 5 rows of durations is the pre-charging duration, and only the last row of duration is the charging duration. For example, in the present disclosure, it can be considered that the duration interval between the falling edges (or rising edges) of the gate signals of two adjacent rows is one-row duration, which will not be repeated in the following.

In the liquid crystal display panel, in order to avoid the afterimage phenomenon caused by the destruction of the polarities of the liquid crystal molecules, a display voltage (corresponding to a data signal) at one end of the sub-pixel needs to be continuously changed, is higher or lower than a common voltage at the other end of the sub-pixel, but a voltage difference remains relatively fixed, so that the polarity of each sub-pixel is constantly changing, but the required gray scale is displayed. The relationship between the polarities of adjacent sub-pixels determines a polarity conversion manner. The polarity conversion manner usually includes four types: frame inversion, row inversion, column inversion, and dot inversion; the frame inversion means that all adjacent sub-pixels in each picture have the same polarity; the row inversion and the column inversion mean that the same row or column has the same polarity, and adjacent rows or columns have opposite polarities; the dot inversion means that each sub-pixel and a sub-pixel adjacent to the each sub-pixel have opposite polarities. For the column pixel structure with the data signal column inversion manner, the pre-charging can achieve the charging improvement, because the data signal almost does not need to consider the rising delay, the difference between data signals of two adjacent rows is small, and the image quality is good.

With the advent of high resolution and high refresh rate, the each row of charging duration of the display panel is correspondingly reduced, resulting in insufficient charging of the sub-pixels in each row, furthermore resulting in poor picture quality. For example, taking a resolution of M*N and a refresh rate of K as an example, M represents the number of sub-pixel rows, and N represents the number of sub-pixel columns, and then one-row duration is T=1/K/M. Through calculation, it can be known that for the charging sequence as shown in FIG. 2, as K and M increase, the available charging duration (that is, one-row duration) of each row of pixels becomes shorter and shorter. For example, for a product with a resolution of 8K and a refresh rate of 120 Hz, the charging duration of each row of sub-pixels is only 1.85 microseconds. In addition, as shown in FIG. 1, as the resolution of the display panel increases, the RC loading of the signal lines in the display panel becomes more serious, which in turn causes the charging effect of each row of sub-pixels away from the data driving circuit 30 to be further deteriorated.

At least some embodiments of the present disclosure provide a display driving method. The display driving method includes: when displaying an odd-numbered frame, providing first parity row data of the odd-numbered frame to a display array, to enable a third parity row of the display array to be displayed based on real data of the first parity row data and enable a fourth parity row of the display array to be displayed based on interpolation data of the first parity row data; when displaying an even-numbered frame, providing second parity row data of the even-numbered frame to the display array, to enable the fourth parity row of the display array to be displayed based on real data of the second parity row data and enable the third parity row of the display array to be displayed based on interpolation data of the second parity row data. Any row of the display array has a two-row charging duration before displaying; in a case where the any row of the display array displays based on real data, the two-row charging duration of the any row is used to charge the any row according to the real data corresponding to the any row; in a case where the any row of the display array displays based on interpolation data, a next-row charging duration of the two-row charging duration of the any row is used to charge the any row according to real data corresponding to an adjacent row of the any row, a previous-row charging duration of the two-row charging duration of the any row is used to charge the any row according to real data corresponding to another adjacent row of the any row or is not used to charge the any row; the first parity row data is one of odd-numbered row data and even-numbered row data, and the second parity row data is the other of the odd-numbered row data and the even-numbered row data; the third parity row is one of an odd-numbered row and an even-numbered row, and the fourth parity row is the other of the odd-numbered row and the even-numbered row.

Some embodiments of the present disclosure also provide a display driving device, a display panel, and an electronic device corresponding to the above-mentioned display driving method.

The display driving method provided by some embodiments of the present disclosure, by enabling the display array alternately to be displayed based on the odd-numbered row data or the even-numbered row data of each frame, can achieve the frequency multiplication of the refresh rate of the display device, and can solve the problem of poor image quality of the display device with high resolution and high refresh rate due to insufficient charging, thereby helping to improve the fluency of the image quality and improve the viewing effect.

Several embodiments of the present disclosure will be described in detail below with reference to the accompanying drawings. It should be noted that, in order to keep the description of the embodiments of the present disclosure clear and concise, detailed descriptions of known functions and known parts (elements) may be omitted. When any part (element) of the embodiment of the present disclosure appears in more than one drawing, the part (element) is represented by the same or similar reference numeral in each drawing.

Figure 3:
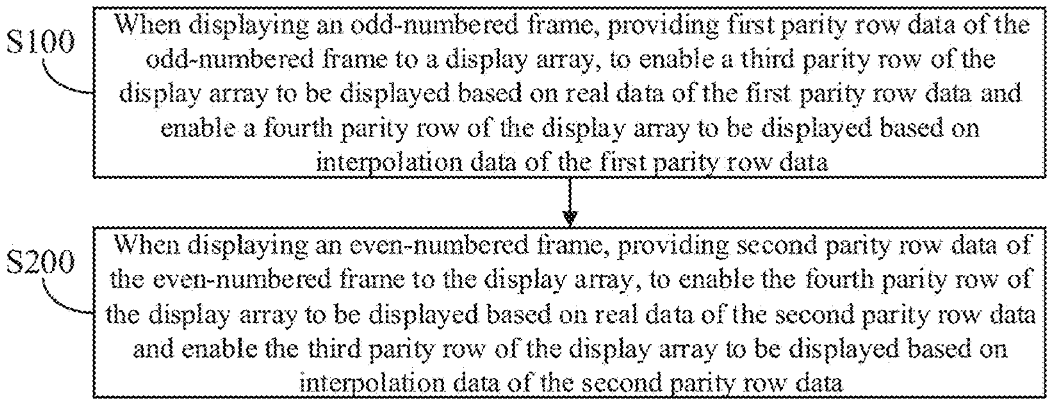
FIG. 3 is a flowchart of a display driving method provided by some embodiments of the present disclosure.

FIG. 3 is a flowchart of a display driving method provided by some embodiments of the present disclosure. As shown in FIG. 3, the display driving method includes the following steps S100 to S200.

Step S100: when displaying an odd-numbered frame, providing first parity row data of the odd-numbered frame to a display array, to enable a third parity row of the display array to be displayed based on real data of the first parity row data and enable a fourth parity row of the display array to be display based on interpolation data of the first parity row data;

Step S200: when displaying an even-numbered frame, providing second parity row data of the even-numbered frame to the display array, to enable the fourth parity row of the display array to be displayed based on real data of the second parity row data and enable the third parity row of the display array to be displayed based on interpolation data of the second parity row data.

For example, the display array can refer to the pixel array in the display device shown in FIG. 1, and similar portions will not be repeated here.

For example, any row of the display array has a two-row charging duration before displaying; in a case where the any row of the display array displays based on real data, the two-row charging duration of the any row is used to charge the any row according to the real data corresponding to the any row; in a case where the any row of the display array displays based on interpolation data, a next-row charging duration of the two-row charging duration of the any row is used to charge the any row according to real data corresponding to an adjacent row of the any row, a previous-row charging duration of the two-row charging duration of the any row is used to charge the any row according to real data corresponding to another adjacent row of the any row or is not used to charge the any row.

For example, the first parity row data is one of odd-numbered row data and even-numbered row data, and the second parity row data is the other of the odd-numbered row data and the even-numbered row data.

For example, the third parity row is one of an odd-numbered row and an even-numbered row, and the fourth parity row is the other of the odd-numbered row and the even-numbered row.

For example, in some embodiments, during the display process, when the odd-numbered frame is displayed, the odd-numbered row data of the odd-numbered frame can be provided to the display array; at the same time, when the even-numbered frame is displayed, the even-numbered row data of the even-numbered frame is provided to the display array. For example, in other embodiments, during the display process, when the odd-numbered frame is displayed, the even-numbered row data of the odd-numbered frame can be provided to the display array; at the same time, when the even-numbered frame is displayed, the odd-numbered row data of the even-numbered frame is provided to the display array.

For example, during the display process, each row (physical row) of the display array and each row of data (timing-sequence row) of a frame may have at least one of the following four data mapping relationships (i.e., a first data mapping relationship, a second data mapping relationship, a third data mapping relationship, and a fourth data mapping relationship). It should be noted that, in the embodiments of the present disclosure, if any row of the display array displays after being charged for two-row duration according to data of a certain row, it is considered that the any row of the display array corresponds to the certain row of data, and the any row of the display array displays real data; otherwise, the any row of the display array displays interpolation data.

Figure 4A:
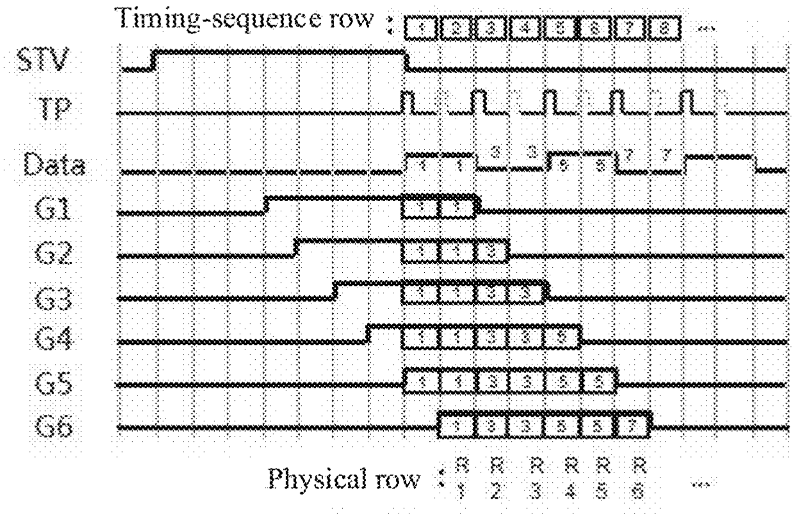
FIGS. 4A-4D are charging timing diagrams, respectively corresponding to four data mapping relationships, of a GOA provided by some embodiments of the present disclosure.

For example, the first data mapping relationship includes: odd-numbered rows of the display array correspondingly displaying real data of odd-numbered row data of one frame, and even-numbered rows of the display array correspondingly displaying interpolation data of the odd-numbered row data of the one frame. For example, as shown in FIG. 4A, the TP signal corresponding to the even-numbered row data can be controlled to be blanked (in FIG. 4A, the blanked TP signal is shown by a dotted line), so that the data driver only outputs the odd-numbered row data of data of one frame to the data line; meanwhile, the gate driver can be controlled to enable a falling edge of a frame start signal STV to be a two-row duration ahead of a falling edge of a first-row gate signal G1, and falling edges of gate signals (shown as G1-G6 in FIG. 4A) of respective rows are delayed by one-row duration in sequence. Therefore, in this case, the odd-numbered row of the display array can display after being charged for two-row duration according to the corresponding odd-numbered row data, that is, the odd-numbered row of the display array displays the real data of the odd-numbered row data; the even-numbered row of the display array is first charged for one-row duration (that is, the previous-row charging duration of the two-row charging duration) according to the real data corresponding to the previous row of the even-numbered row, then is charged for one-row duration (that is, the next-row charging duration of the two-row charging duration) according to the real data corresponding to the next row of the even-numbered row, and then displays, that is, the even-numbered row of the display array displays the interpolation data of the odd-numbered row data.

Figure 4B:
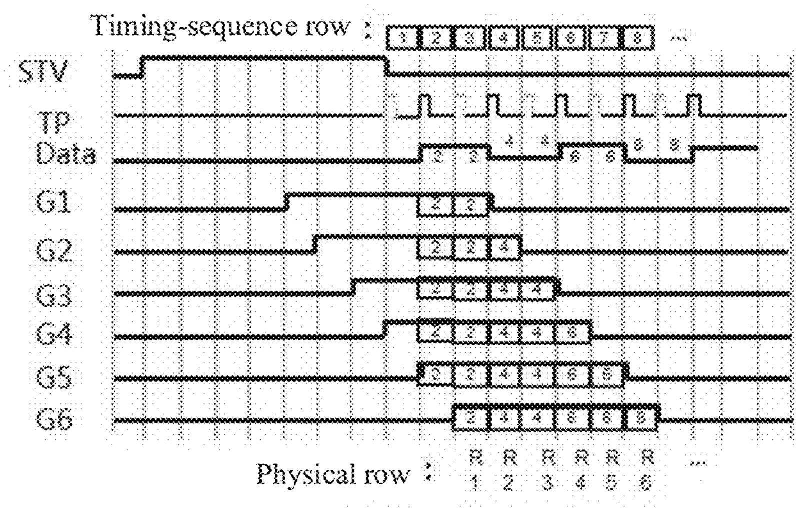

For example, the second data mapping relationship comprises: the odd-numbered rows of the display array correspondingly displaying real data of even-numbered row data of one frame, and the even-numbered rows of the display array correspondingly displaying interpolation data of the even-numbered row data of the one frame. For example, as shown in FIG. 4B, the TP signal corresponding to the odd-numbered row data can be controlled to be blanked (in FIG. 4B, the blanked TP signal is shown by a dotted line), so that the data driver only outputs the even-numbered row data of data of one frame to the data line; meanwhile, the gate driver can be controlled to enable a falling edge of a frame start signal STV to be three-row duration ahead of a falling edge of a first-row gate signal G1, and falling edges of gate signals (shown as G1-G6 in FIG. 4B) of respective rows are delayed by one-row duration in sequence. Therefore, in this case, the odd-numbered row of the display array can display after being charged for two-row duration according to the corresponding even-numbered row data, that is, the odd-numbered row of the display array displays the real data of the even-numbered row data; the even-numbered row of the display array is first charged for one-row duration (that is, the previous-row charging duration of the two-row charging duration) according to the real data corresponding to the previous row of the even-numbered row, then is charged for one-row duration (that is, the next-row charging duration of the two-row charging duration) according to the real data corresponding to the next row of the even-numbered row, and then displays, that is, the even-numbered row of the display array displays the interpolation data of the even-numbered row data.

Figure 4C:
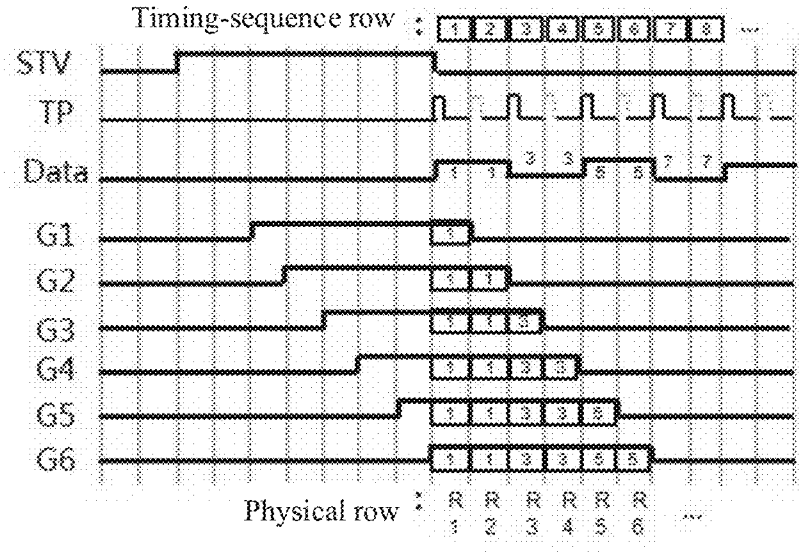

For example, the third data mapping relationship comprises: the even-numbered rows of the display array correspondingly displaying real data of odd-numbered row data of one frame, and the odd-numbered rows of the display array correspondingly displaying interpolation data of the odd-numbered row data of the one frame. For example, as shown in FIG. 4C, the TP signal corresponding to the even-numbered row data can be controlled to be blanked (in FIG. 4C, the blanked TP signal is shown by a dotted line), so that the data driver only outputs the odd-numbered row data of data of one frame to the data line; meanwhile, the gate driver can be controlled to enable a falling edge of a frame start signal STV to be one-row duration ahead of a falling edge of a first-row gate signal G1, and falling edges of gate signals (shown as G1-G6 in FIG. 4C) of respective rows are delayed by one-row duration in sequence. Therefore, in this case, the even-numbered row of the display array can display after being charged for two-row duration according to the corresponding even-numbered row data, that is, the even-numbered row of the display array displays the real data of the even-numbered row data; the first row of the display array only displays after being charged for one-row duration (that is, the next-row charging duration of the two-row charging duration) according to the real data corresponding to the next row of the first row, the remaining odd-numbered row of the display array is first charged for the one-row duration (that is, the previous-row charging duration of the two-row charging duration) according to the real data corresponding to the previous row of the odd-numbered row, then is charged for one-row duration (that is, the next-row charging duration of the two-row charging duration) according to the real data corresponding to the next row of the odd-numbered row, and then displays, that is, the odd-numbered row of the display array displays the interpolation data of the even-numbered row data.

Figure 4D:
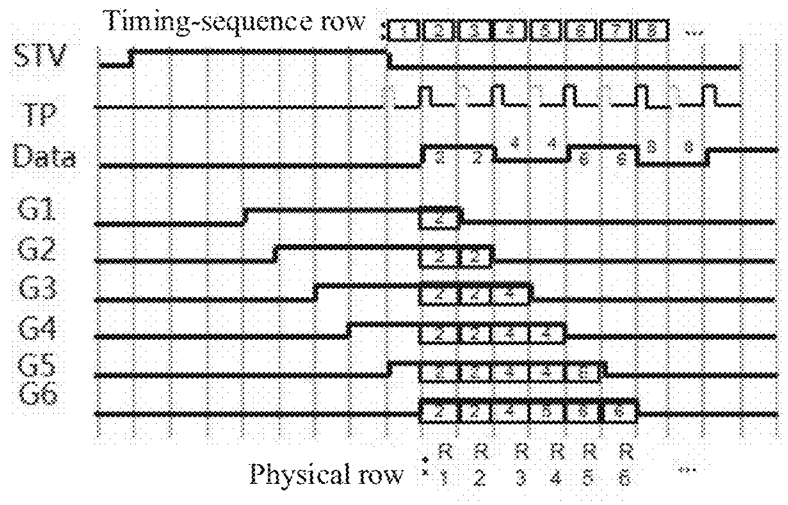

For example, the fourth data mapping relationship comprises: the even-numbered rows of the display array correspondingly displaying real data of even-numbered row data of one frame, and the odd-numbered rows of the display array correspondingly displaying interpolation data of the even-numbered row data of the one frame. For example, as shown in FIG. 4D, the TP signal corresponding to the odd-numbered row data can be controlled to be blanked (in FIG. 4D, the blanked TP signal is shown by a dotted line), so that the data driver only outputs the even-numbered row data of data of one frame to the data line; meanwhile, the gate driver can be controlled to enable a falling edge of a frame start signal STV to be two-row duration ahead of a falling edge of a first-row gate signal G1, and falling edges of gate signals (shown as G1-G6 in FIG. 4D) of respective rows are delayed by one-row duration in sequence. Therefore, in this case, the even-numbered row of the display array can display after being charged for two-row duration according to the corresponding odd-numbered row data, that is, the even-numbered row of the display array displays the real data of the odd-numbered row data; the first row of the display array only displays after being charged for one-row duration (that is, the next-row charging duration of the two-row charging duration) according to the real data corresponding to the next row of the first row, the remaining odd-numbered row of the display array is first charged for one-row duration (that is, the previous-row charging duration of the two-row charging duration) according to the real data corresponding to the previous row of the odd-numbered row, then is charged for one-row duration (that is, the next-row charging duration of the two-row charging duration) according to the real data corresponding to the next row of the odd-numbered row, and then displays, that is, the odd-numbered row of the display array displays the interpolation data of the odd-numbered row data.

It should be understood that, in the embodiments of the present disclosure, for a case that the first row of the display array only displays after being charged for one-row duration (that is, the next-row charging duration of the two-row charging duration) according to the real data corresponding to the next row of the first row, it is also considered that the first row of the display array displays the interpolated data of the even-numbered row (that is, the second row) data.

For, for example, a display device with 8 k and 120 Hz, adopting the above display driving method can ensure that the odd-numbered rows or the even-numbered rows are fully charged during the display process; meanwhile, due to the visual inertia of the human eye, the display effect is almost the same as the display effect of a display device with 8K and 60 Hz. Therefore, the above display driving method can achieve an improvement in the refresh rate, and can provide a better gaming experience for game players (requiring a high refresh rate).

For liquid crystal display devices, in order to avoid the afterimage phenomenon caused by the polarization of the liquid crystal molecules, a display voltage (corresponding to the data signal) at one end of the sub-pixel needs to be continuously changed and is higher or lower than a common voltage at the other end of the sub-pixel, but a voltage difference remains relatively constant, so that the polarity of each sub-pixel is constantly changing, but the required gray scale is displayed. For example, in some embodiments, the above display driving method may further include: when displaying a plurality of frames, periodically changing a data polarity of each frame. For example, the data polarity includes a first polarity and a second polarity, and the first polarity is opposite to the second polarity. For example, the first polarity may be a positive polarity, and corresponds to a situation where the voltage of the data signal is higher than the common voltage; and the second polarity may be a negative polarity, and corresponds to a situation where the voltage of the data signal is lower than the common voltage. Of course, the first polarity can also be a negative polarity, and the second polarity can also be a positive polarity.

For example, in some embodiments, the data driver in the display device may provide data signals of different polarities according to the positive or negative (or high or low) of the polarity signal POL (referred to as "POL signal").

For example, in some embodiments, the above display driving method may further include: when displaying the plurality of frames, periodically changing a data mapping relationship of each frame. For example, a minimum change period (i.e., a second minimum change period) of the data mapping relationship of each frame may be 2 frames or 4 frames, and the embodiments of the present disclosure include but are not limited to this case. For example, in some embodiments, the data mapping relationship of each frame may be changed periodically, so that within a minimum common period of the data polarity and the data mapping relationship of each frame, ach type of data mapping relationship corresponds to both the first polarity and the second polarity, so as to better avoid the polarization of the liquid crystal molecules and avoid the afterimage phenomenon. For example, in some embodiments, in the minimum common period, a count of data mapping relationships, corresponding to the first polarity is equal to a count of data mapping relationships, corresponding to the second polarity, so as to better avoid the polarization of the liquid crystal molecules and avoid the afterimage phenomenon.

Figure 5:
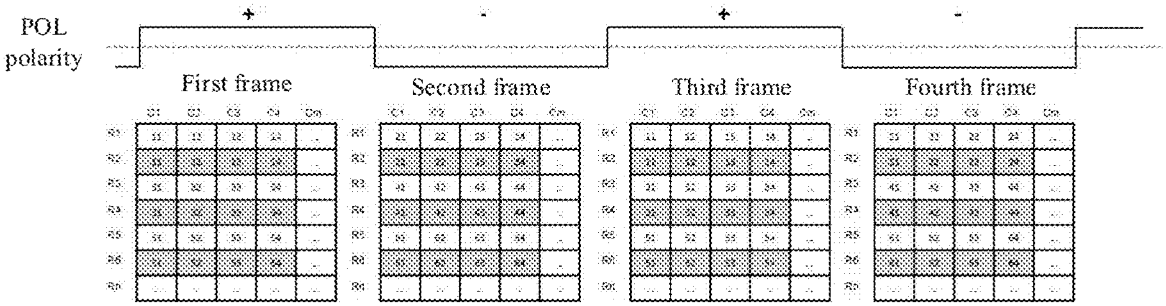
FIG. 5 is a schematic diagram of a setting situation of a POL signal and a data mapping relationship provided by some embodiments of the present disclosure.

For example, in some embodiments, a minimum change period (i.e., a first minimum change period) of the data polarity of each frame is 2 frames; in the first minimum change period, the data polarity of one frame is the first polarity, and the data polarity of the other frame is the second polarity. For example, as shown in FIG. 5, when the first minimum change period is 2 frames, in each first minimum change period, the data polarity (that is, the POL polarity) of the odd-numbered frame (a first frame and a third frame as shown in FIG. 5) can be a positive polarity, and the data polarity of the even-numbered frame (a second frame and a fourth frame as show in FIG. 5) can be a negative polarity, so that the polarization of the liquid crystal molecules can be avoided to a certain extent and the afterimage phenomenon can be avoided. For example, in the embodiment shown in FIG. 5, a row with a white background indicates that the row displays real data, and a row with a gray background indicates that the row displays interpolated data.

For example, in the embodiment shown in FIG. 5, the minimum change period (that is, the second minimum change period) of the data mapping relationship of each frame may be 2 frames. In this case, a minimum common period of the data polarity and the data mapping relationship of each frame is 2 frames. For example, within each second minimum change period, the display array can display odd-numbered frames according to the aforementioned first data mapping relationship, and display even-numbered frames according to the foregoing second data mapping relationship, correspondingly, in this case, the odd-numbered row data of the odd-numbered frame can be provided to the display array when the odd-numbered frame is displayed, and the even-numbered row data of the even-numbered frame can be provided to the display array when the even-numbered frame is displayed; alternatively, within each second minimum change period, the display array may display odd-numbered frames according to the foregoing second data mapping relationship, and display even-numbered frames according to the foregoing first data mapping relationship, correspondingly, in this case, the display array may be provided with even-numbered row data of the odd-numbered frame when displaying the odd-numbered frame, and the display array may be provided with odd-numbered row data of the even-numbered frame when displaying the even-numbered frame. It should be understood that the present disclosure includes but is not limited to this, that is, in the embodiments of the present disclosure, the other two of the aforementioned four data mapping relationships can be selected for use in combination as required.

For example, in the embodiment shown in FIG. 5, the minimum change period (that is, the second minimum change period) of the data mapping relationship of each frame may be 4 frames. In this case, a minimum common period of the data polarity and the data mapping relationship of each frame is 4 frames. For example, within each second minimum change period, the display array may display the first frame according to the aforementioned first data mapping relationship, display the second frame according to the aforementioned second data mapping relationship, display the third frame according to the aforementioned second data mapping relationship, and display the fourth frame according to the aforementioned first data mapping relationship, correspondingly, in this case, the odd-numbered row data of the odd-numbered frame can be provided to the display array when the first frame is displayed, the even-numbered row data of the even-numbered frame can be provided to the display array when the second frame is displayed, the even-numbered row data of the odd-numbered frame is provided to the display array when the third frame is displayed, and the odd-numbered row data of the even-numbered frame is provided to the display array when the fourth frame is displayed. In this case, in the minimum common period, the first data mapping relationship corresponds to both the positive polarity and the negative polarity, similarly, the second data mapping relationship corresponds to both the positive polarity and the negative polarity; at the same time, in the minimum common period, the number of the first data mapping relationship corresponding to the positive polarity is equal to the number of the first data mapping relationship corresponding to the negative polarity (both are 1), and the number of the second data mapping relationship corresponding to the positive polarity is equal to the number of the second data mapping relationship corresponding to the negative polarity (both are 1). As a result, it is possible to further avoid the polarization of the liquid crystal molecules and the afterimage phenomenon. It should be understood that the present disclosure includes but is not limited to this case, that is, in the embodiments of the present disclosure, the order of various data mapping relationships selected can be set according to needs.

For example, in other embodiments, the first minimum change period of the data polarity of each frame is 4n frames, n is a positive integer greater than or equal to 1; in the first minimum change period, data polarities of n odd-numbered frame(s) and n even-numbered frame(s) are the first polarity, and data polarities of remaining n odd-numbered frame(s) and remaining n even-numbered frame(s) are the second polarity. For example, n is equal to 1 or n is equal to 2; it should be noted that the embodiments of the present disclosure include but are not limited to this case.

Figure 6:
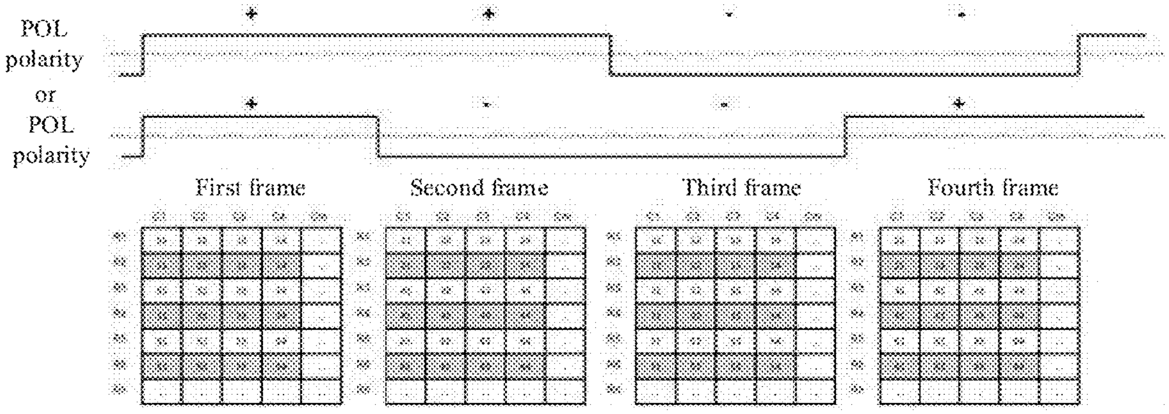
FIG. 6 is a schematic diagram of another setting situation of a POL signal and a data mapping relationship provided by some embodiments of the present disclosure.

For example, as shown in FIG. 6, in a case where the first minimum change period is 4 frames (that is, n=1), in each first minimum change period, the data polarities (that is, POL polarities) corresponding to the first frame and the second frame can be the positive polarity, and the data polarities corresponding to the third frame and the fourth frame can be the negative polarity; alternatively, in each first minimum change period, the data polarities (that is, the POL polarities) corresponding to the first frame and the fourth frame may be the positive polarity, and the data polarities corresponding to the second frame and the third frame may be the negative polarity; therefore, the polarization of the liquid crystal molecules can also be avoided to a certain extent to avoid generating the afterimage phenomenon. For example, in the embodiment shown in FIG. 6, a row with a white background indicates that the row displays real data, and a row with a gray background indicates that the row displays interpolated data.

For example, in the embodiment shown in FIG. 6, the minimum change period (that is, the second minimum change period) of the data mapping relationship of each frame may be 2 frames, in this case, the minimum common period of the data polarity and the data mapping relationship of each frame is 4 frames. For example, in each second minimum change period, the display array displays odd-numbered frames (as shown in the first frame and the third frame in FIG. 6) according to the aforementioned first data mapping relationship, and displays even-numbered frames (as shown in the second frame and the fourth frame in FIG. 6) according to the aforementioned second data mapping relationship; correspondingly, in this case, the odd-numbered row data of the odd-numbered frame can be provided to the display array when displaying the odd-numbered frame, and the even-numbered row data of the even-numbered frame can be provided to the display array when displaying the even-numbered frame; alternatively, in each second minimum change period, the display array displays odd-numbered frames according to the aforementioned second data mapping relationship, and displays even-numbered frames according to the aforementioned first data mapping relationship; correspondingly, in this case, the even-numbered row data of the odd-numbered frame can be provided to the display array when displaying the odd-numbered frame, and the odd-numbered row data of the even-numbered frame can be provided to the display array when displaying the even-numbered frame. In this case, within the minimum common period, the first data mapping relationship corresponds to both the positive polarity and the negative polarity, similarly, the second data mapping relationship corresponds to both the positive polarity and the negative polarity; at the same time, in the minimum common period, the number of the first data mapping relationship corresponding to the positive polarity is equal to the number of the first data mapping relationship corresponding to the negative polarity (both are 1), and the number of the second data mapping relationship corresponding to the positive polarity is equal to the number of the second data mapping relationship corresponding to the negative polarity (both are 1). As a result, it is possible to better avoid the afterimage phenomenon caused by the polarization of the liquid crystal molecules. It should be understood that the present disclosure includes but is not limited to this case, that is, in the embodiment shown in FIG. 6, the other two of the foregoing four data mapping relationships can be selected for use in combination as required, and at the same time, the order of various data mapping relationships selected can also be set according to needs.

Figure 7:
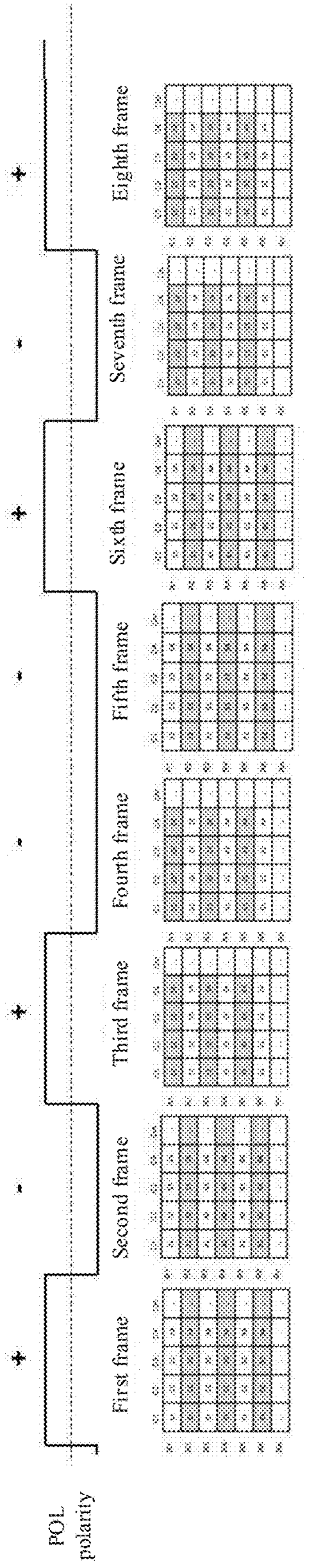
FIG. 7 is a schematic diagram of still another setting situation of a POL signal and a data mapping relationship provided by some embodiments of the present disclosure.

For example, in a case where the first minimum change period is 8 frames (i.e., n=1), as shown in FIG. 7, in each first minimum change period, the data polarities (that is, POL polarities) corresponding to the first frame, the third frame, the sixth frame, and the eighth frame can be the positive polarity, and the data polarities corresponding to the second frame, the fourth frame, the fifth frame, and the seventh frame can be the negative polarity. Therefore, the polarization of the liquid crystal molecules and the afterimage phenomenon can also be avoided to a certain extent. It should be noted that the change order of the data polarities shown in FIG. 7 is schematic, in each first minimum change period, the change order of the data polarities can be set as required. For example, in the embodiment as shown in FIG. 7, a row with a white background indicates that the row displays real data, and a row with a gray background indicates that the row displays interpolated data; in addition, when the top right corner of the data of the first row of the display array is marked with a symbol of "'", it means that the first row of the display array displays only after being charged for one-row duration (that is, the next-row charging duration of the two-row charging duration) according to the real data corresponding to the next row of the first row.

For example, in the embodiment shown in FIG. 7, the minimum change period (that is, the second minimum change period) of the data mapping relationship of each frame may be 4 frames, in this case, the minimum common period of the data polarity and the data mapping relationship of each frame is 8 frames. For example, in each second minimum change period, the display array displays the first frame and the fifth frame according to the aforementioned first data mapping relationship, displays the second frame and the sixth frame according to the aforementioned second data mapping relationship, displays the third frame and the seventh frame according to the aforementioned third data mapping relationship, and displays the fourth frame and the eighth frame according to the aforementioned fourth data mapping relationship; correspondingly, in this case, the odd-numbered row data of the odd-numbered frame can be provided to the display array when displaying the odd-numbered frame, and the even-numbered row data of the even-numbered frame can be provided to the display array when displaying the even-numbered frame. In this case, within the minimum common period, the first data mapping relationship corresponds to both the positive polarity and the negative polarity, the second data mapping relationship corresponds to both the positive polarity and the negative polarity, the third data mapping relationship corresponds to both the positive polarity and the negative polarity, and the fourth data mapping relationship corresponds to both the positive polarity and the negative polarity; at the same time, in the minimum common period, the number of the first data mapping relationship corresponding to the positive polarity is equal to the number of the first data mapping relationship corresponding to the negative polarity (both are 1), the number of the second data mapping relationship corresponding to the positive polarity is equal to the number of the second data mapping relationship corresponding to the negative polarity (both are 1), the number of the third data mapping relationship corresponding to the positive polarity is equal to the number of the third data mapping relationship corresponding to the negative polarity (both are 1), and the number of the fourth data mapping relationship corresponding to the positive polarity is equal to the number of the fourth data mapping relationship corresponding to the negative polarity (both are 1). As a result, it is possible to further avoid the afterimage phenomenon caused by the polarization of the liquid crystal molecules and to improve the display uniformity. It should be understood that the present disclosure includes but is not limited to this case, that is, in the embodiments of the present disclosure, the order of various data mapping relationships selected can also be set according to needs.

It should be understood that, in the embodiments of the present disclosure, if a y1-th (y1 is a positive integer) row of the display array always displays the real data, and a y2-th (y2 is a positive integer, and y2 is not equal to y1) row of the display array always displays the interpolated data, because the distribution of the interpolated data is different from the distribution of the real data (a probability of interpolated data getting the intermediate value is greater than a probability of real data getting the intermediate value, and a probability of interpolating data getting the maximum value and the minimum value is greater than a probability of real data getting the maximum value and the minimum value), which may lead to a phenomenon of uneven display. For example, in some embodiments, in order to avoid the above-mentioned phenomenon of uneven display, the second minimum change period of the data mapping relationship of each frame may be set to 4 frames. In this case, the display driving method may include: when displaying an (x1)-th frame in the second minimum change period, providing odd-numbered row data of the (x1)-th frame to the display array, so that the display array displays according to the first data mapping relationship; when displaying an (x2)-th frame in the second minimum change period, providing even-numbered row data of the (x2)-th frame to the display array, so that the display array displays according to the second data mapping relationship; when displaying an (x3)-th frame in the second minimum change period, providing odd-numbered row data of the (x3)-th frame to the display array, so that the display array displays according to the third data mapping relationship; when displaying an (x4)-th frame in the second minimum change period, providing even-numbered row data of the (x4)-th frame to the display array, so that the display array displays according to the fourth data mapping relationship; a group {x1, x2, x3, x4} is identical with a group {1, 2, 3, 4}, that is, the values of x1, x2, x3, and x4 are respectively elements in the group {1, 2, 3, 4}, and the values of x1, x2, x3, and x4 are different from each other. For example, in some embodiments (referring to the embodiment shown in FIG. 7), on this basis, the first minimum change period of the data polarity of each frame can be further coordinated to control, so that within the minimum common period of the data polarity and the data mapping relationship of each frame (that is, the minimum common period of the first minimum change period and the second minimum change period), each type of data mapping relationship corresponds to both the first polarity and the second polarity, and the count of data mapping relationships, corresponding to the first polarity is equal to the count of data mapping relationships, corresponding to the second polarity, thereby avoiding the polarization of the liquid crystal molecules and the afterimage phenomenon to the greatest extent.

For example, in some embodiments, as shown in FIGS. 4A-4D, any row of the display array has at least one-row pre-charging duration before displaying, and the at least one-row pre-charging duration is before the two-row charging duration. For example, for the column pixel structure with the data signal column inversion manner, the pre-charging can achieve the charging improvement, because the data signal almost does not need to consider the rising delay, the difference between data signals of two adjacent rows is small, and the image quality is good.

It should be understood that in the display driving method provided by the embodiment of the present disclosure, the refresh rate can be improved and the afterimage phenomenon can be avoided by coordinating the following three selections or settings: 1) when displaying respective frames, choosing to provide the odd-numbered row data or the even-numbered row data to the display array; 2) setting the change order of the data polarities of the respective frames; 3) selecting one or more of the aforementioned four data mapping relationships, and setting the change order of various data mapping relationships when selecting a plurality of data mapping relationships.

Figure 8:
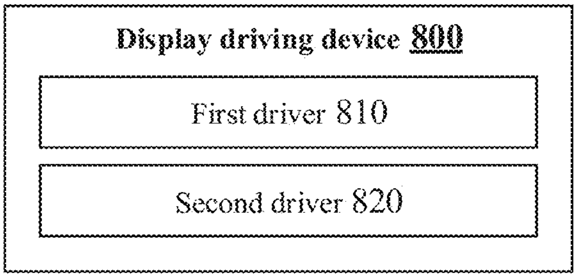
FIG. 8 is a schematic block diagram of a display driving device provided by some embodiments of the present disclosure.

Some embodiments of the present disclosure also provide a display driving device. FIG. 8 is a schematic block diagram of a display driving device provided by some embodiments of the present disclosure. For example, as shown in FIG. 8, the display driving device 800 includes a first driver 810 and a second driver 820.

For example, the first driver 810 is configured to: when displaying an odd-numbered frame, provide first parity row data of the odd-numbered frame to a display array, and when displaying an even-numbered frame, provide second parity row data of the even-numbered frame to the display array; the second driver 820 is configured to: when displaying the odd-numbered frame, enable a third parity row of the display array to be displayed based on real data of the first parity row data and enable a fourth parity row of the display array to be displayed based on interpolation data of the first parity row data; and when displaying the even-numbered frame, enable the fourth parity row of the display array to be displayed based on real data of the second parity row data and enable the third parity row of the display array to be displayed based on interpolation data of the second parity row data; the first driver 810 and the second driver 820 are further configured to: enable any row of the display array have a two-row charging duration before displaying; in a case where the any row of the display array displays based on real data, enable the two-row charging duration of the any row to be used to charge the any row according to the real data corresponding to the any row; in a case where the any row of the display array displays based on interpolation data, enable a next-row charging duration of the two-row charging duration of the any row to be used to charge the any row according to real data corresponding to an adjacent row of the any row and enable a previous-row charging duration of the two-row charging duration of the any row to be used to charge the any row according to real data corresponding to another adjacent row of the any row or be not used to charge the any row. For example, the first parity row data is one of odd-numbered row data and even-numbered row data, and the second parity row data is the other of the odd-numbered row data and the even-numbered row data. Thus, the display driving device 800 can be used to implement the aforementioned display driving method.

For example, in some embodiments, the first driver 810 is further configured to: when displaying a plurality of frames, periodically change a data polarity of each frame. For example, the data polarity comprises a first polarity and a second polarity, and the first polarity is opposite to the second polarity. Therefore, the display driving device 800 can prevent the polarization of the liquid crystal molecules from causing the afterimage phenomenon.

For example, in some embodiments (referring to the embodiment shown in FIG. 5), the minimum change period (that is, the first minimum change period) of the data polarity of each frame is 2 frames; in the first minimum change period, the data polarity of one frame is the first polarity, and the data polarity of the other frame is the second polarity. For example, in other embodiments (referring to the embodiments shown in FIG. 6 and FIG. 7), the first minimum change period of the data polarity of each frame is 4n frames, and n is a positive integer greater than or equal to 1; in the first minimum change period, data polarities of n odd-numbered frame(s) and n even-numbered frame(s) are the first polarity, and data polarities of remaining n odd-numbered frame(s) and remaining n even-numbered frame (s) are the second polarity. For example, n is equal to 1 or n is equal to 2, and the embodiments of the present disclosure include but are not limited to this case.

For example, in some embodiments, the second driver is further configured to: when displaying the plurality of frames, periodically change a data mapping relationship of each frame, so that within a minimum common period of the data polarity and the data mapping relationship of each frame, each type of data mapping relationship corresponds to both the first polarity and the second polarity. For example, in some embodiments, within the minimum common period, a count of data mapping relationships, corresponding to the first polarity is equal to a count of data mapping relationships, corresponding to the second polarity. Therefore, the display driving device 800 can further prevent the polarization of the liquid crystal molecules from causing an afterimage phenomenon.

For example, in some embodiments, the data mapping relationship comprises a first data mapping relationship, a second data mapping relationship, a third data mapping relationship, and a fourth data mapping relationship. For example, for the specific details of the four types of data mapping relationships, reference may be made to the aforementioned related descriptions, which will not be repeated here.

For example, in some embodiments, the second minimum change period of the data mapping relationship of each frame is 4 frames. In this case, the first driver 810 is configured to: when displaying an (x1)-th frame in the second minimum change period, provide odd-numbered row data of the (x1)-th frame to the display array; when displaying an (x2)-th frame in the second minimum change period, provide even-numbered row data of the (x2)-th frame to the display array; when displaying an (x3)-th frame in the second minimum change period, provide odd-numbered row data of the (x3)-th frame to the display array; when displaying an (x4)-th frame in the second minimum change period, provide even-numbered row data of the (x4)-th frame to the display array; the second driver 820 is configured to: when displaying the (x1)-th frame in the second minimum change period, enable the display array to be displayed according to the first data mapping relationship; when displaying the (x2)-th frame in the second minimum change period, enable the display array to be displayed according to the second data mapping relationship; when displaying the (x3)-th frame in the second minimum change period, enable the display array to be display according to the third data mapping relationship; when displaying the (x4)-th frame in the second minimum change period, enable the display array to be displayed according to the fourth data mapping relationship. For example, a group {x1, x2, x3, x4} is identical with a group {1, 2, 3, 4}, that is, the values of x1, x2, x3, and x4 are respectively elements in the group {1, 2, 3, 4}, and the values of x1, x2, x3, and x4 are different from each other. For example, in some embodiments (referring to the embodiment shown in FIG. 7), on this basis, the first minimum change period of the data polarity of each frame can be further coordinated to control, so that within the minimum common period of the data polarity and the data mapping relationship of each frame (that is, the minimum common period of the first minimum change period and the second minimum change period), each type of data mapping relationship corresponds to both the first polarity and the second polarity, and the count of data mapping relationships, corresponding to the first polarity is equal to the count of data mapping relationships, corresponding to the second polarity, thereby avoiding the polarization of the liquid crystal molecules and the afterimage phenomenon to the greatest extent.

For example, in some embodiments, the second driver 820 is further configured to: enable any row of the display array to have at least one-row pre-charging duration before displaying. The at least one-row pre-charging duration is before the two-row charging duration. For example, for the column pixel structure with the data signal column inversion manner, the pre-charging can achieve the charging improvement, because the data signal almost does not need to consider the rising delay, the difference between data signals of two adjacent rows is small, and the image quality is good.

For example, the first driver 810 may be implemented as the aforementioned data driving circuit 30 (data driver). For example, the first driver 810 may provide data signals as required. For example, when displaying each frame, the odd-numbered row data or the even-numbered row data may be provided to the display array according to the blanking condition of the TP signal. For example, the first driver 810 may also adjust the data polarity of the data signal as required. For example, when displaying each frame, the data polarity of the data signal may be adjusted according to the polarity of the POL signal. Thus, the first driver 810 can periodically change the data polarity of each frame.

For example, the second driver 820 may be implemented as the aforementioned gate driving circuit 20 (gate driver). For example, the second driver 820 can provide gate signals as required, for example, when displaying each frame, the delay time of the gate signal of the first row relative to the frame start signal STV and the delay time between the gate signals of the respective rows can be controlled. Thus, the second driver 820 can periodically change the data mapping relationship of each frame.

For example, the first driver 810 and the second driver 820 can cooperatively control the charging duration of each row of the display array, for example, each row of the display array can have two-row charging duration (that is, the charging duration is time for two rows). For example, on this basis, the second driver 820 can also adjust the pre-charging duration of each row of the display array by controlling the duration of each gate signal. For specific details, reference may be made to the aforementioned related description, and similar portions will not be repeated here.

It should be understood that, in the display driving device 800 provided by the embodiment of the present disclosure, the refresh rate can be improved and the afterimage phenomenon can be avoided by performing the following settings through the first driver 810 and the second driver 82: 1) when displaying respective frames, selectively providing the odd-numbered row data or the even-numbered row data to the display array through the first driver 810; 2) setting the change order of the data polarities of the respective frames through the first driver 810; 3) selecting one or more of the aforementioned four data mapping relationships and setting the change order of various data mapping relationships when selecting a plurality of data mapping relationships through the second driver 820.

For the technical effects of the display driving device provided by the embodiment of the present disclosure, reference may be made to the corresponding description of the display driving method in the above-mentioned embodiments, and similar portions will not be repeated here.

Figure 9:
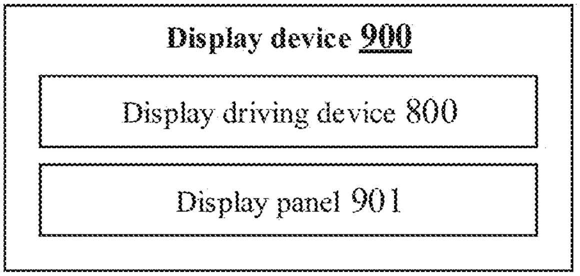
FIG. 9 is a schematic block diagram of a display device provided by some embodiments of the present disclosure.

Some embodiments of the present disclosure also provide a display device. FIG. 9 is a schematic block diagram of a display device provided by some embodiments of the present disclosure. For example, as shown in FIG. 9, the display device 900 includes the aforementioned display driving device 800 and a display panel 901. For example, the display panel 901 includes a display array.

For example, the display device 900 may be implemented as the display device shown in FIG. 1. For example, the display driving device 800 may be implemented as the data driving circuit 30 and the gate driving circuit 20 shown in FIG. 1; for example, the display panel 901 may be implemented as the display panel 1 shown in FIG. 1, and the display array on the display panel 901 may be implemented as the pixel array on the display panel 1. For specific details, reference may be made to the aforementioned related description, which will not be repeated here.

For example, in some embodiments, the display device 900 may be a liquid crystal display device, that is, the display panel 901 is a liquid crystal display panel. It should be noted that the present disclosure includes but is not limited to this.

It should be noted that the display device in the embodiment can be any product or component with a display function such as a display, an electronic paper display device, a mobile phone, a tablet computer, a notebook computer, a digital photo frame, a navigator, etc., and the embodiments of the present disclosure do not limit this.

It should be noted that for the sake of clarity and conciseness, the entire structure of the display device 900 is not shown. In order to implement the necessary functions of the display device, those skilled in the art can set other structures not shown according to specific application scenarios, and the embodiments of the present disclosure are not limited in this aspect.

For the technical effects of the display device provided by the embodiment of the present disclosure, reference may be made to the corresponding description of the display driving device in the above-mentioned embodiments, and similar portions will not be repeated here.

The following should be noted:

(1) Only the structures involved in the embodiments of the present disclosure are illustrated in the drawings of the embodiments of the present disclosure, and other structures can refer to usual designs;

(2) The embodiments and features in the embodiments of the present disclosure may be combined in case of no conflict to acquire new embodiments.

What have been described above merely are exemplary embodiments of the present disclosure, and not intended to define the scope of the present disclosure, and the scope of the present disclosure is determined by the appended claims.

What is claimed is:

1. A display driving method, comprising:

when displaying an odd-numbered frame, providing first parity row data of the odd-numbered frame to a display array, to enable a third parity row of the display array to be displayed based on real data of the first parity row data and enable a fourth parity row of the display array to be displayed based on interpolation data of the first parity row data;

when displaying an even-numbered frame, providing second parity row data of the even-numbered frame to the display array, to enable the fourth parity row of the display array to be displayed based on real data of the second parity row data and enable the third parity row of the display array to be displayed based on interpolation data of the second parity row data, wherein any row of the display array except a first row has a two-row charging duration before displaying;

in a case where the any row of the display array displays based on real data, the two-row charging duration of the any row is used to charge the any row according to the real data corresponding to the any row;

in a case where the any row of the display array displays based on interpolation data, a next-row charging duration of the two-row charging duration of the any row is used to charge the any row according to real data corresponding to an adjacent row of the any row, a previous-row charging duration of the two-row charging duration of the any row is used to charge the any row according to real data corresponding to another adjacent row of the any row or is not used to charge the any row;

the first parity row data is one of odd-numbered row data and even-numbered row data, and the second parity row data is the other of the odd-numbered row data and the even-numbered row data;

the third parity row is one of an odd-numbered row except the first row and an even-numbered row, and the fourth parity row is the other of the odd-numbered row and the even-numbered row;

when displaying a plurality of frames, periodically changing a data polarity of each frame, wherein the data polarity of each frame comprises a first polarity and a second polarity, and the first polarity is opposite to the second polarity;

when displaying the plurality of frames, periodically changing a data mapping relationship of each frame, so that within a minimum common period of the data polarity and the data mapping relationship of each frame, each type of data mapping relationship corresponds to both the first polarity and the second polarity;

wherein the data mapping relationship of each frame comprises at least one selected from a group consisting of a first data mapping relationship, a second data mapping relationship, a third data mapping relationship, and a fourth data mapping relationship;

the first data mapping relationship comprises: odd-numbered rows of the display array correspond to display real data of odd-numbered row data of one frame, and even-numbered rows of the display array correspond to display interpolation data of the odd-numbered row data of the one frame;

the second data mapping relationship comprises: odd-numbered rows of the display array correspond to display real data of even-numbered row data of one frame, and even-numbered rows of the display array correspond to display interpolation data of the even-numbered row data of the one frame;

the third data mapping relationship comprises: even-numbered rows of the display array correspond to display real data of odd-numbered row data of one frame, and odd-numbered rows of the display array correspond to display interpolation data of the odd-numbered row data of the one frame; and the fourth data mapping relationship comprises: even-numbered rows of the display array correspond to display real data of even-numbered row data of one frame, and odd-numbered rows of the display array correspond to display interpolation data of the even-numbered row data of the one frame.

2. The display driving method according to claim 1, wherein a first minimum change period of the data polarity of each frame is 2 frames; and in the first minimum change period, a data polarity of one frame of the 2 frames is the first polarity, and a data polarity of the other frame of the 2 frames is the second polarity.

3. The display driving method according to claim 1, wherein a first minimum change period of the data polarity of each frame is 4n frames, and n is a positive integer greater than or equal to 1; and in the first minimum change period, data polarities of n odd-numbered frame(s) and n even-numbered frame(s) are the first polarity, and data polarities of remaining n odd-numbered frame(s) and remaining n even-numbered frame(s) are the second polarity.

4. The display driving method according to claim 3, wherein n is equal to 1 or n is equal to 2.

5. The display driving method according to claim 1, wherein in the minimum common period, a count of data mapping relationships, corresponding to the first polarity is equal to a count of data mapping relationships, corresponding to the second polarity.

6. The display driving method according to claim 1, wherein a second minimum change period of each frame of data mapping relationship is 4 frames, the display driving method comprises:

when displaying an (x1)-th frame in the second minimum change period, providing odd-numbered row data of the (x1)-th frame to the display array, so that the display array displays according to the first data mapping relationship;

when displaying an (x2)-th frame in the second minimum change period, providing even-numbered row data of the (x2)-th frame to the display array, so that the display array displays according to the second data mapping relationship;

when displaying an (x3)-th frame in the second minimum change period, providing odd-numbered row data of the (x3)-th frame to the display array, so that the display array displays according to the third data mapping relationship;

when displaying an (x4)-th frame in the second minimum change period, providing even-numbered row data of the (x4)-th frame to the display array, so that the display array displays according to the fourth data mapping relationship;

wherein a group {x1, x2, x3, x4} is identical to a group {1, 2, 3, 4}.

7. The display driving method according to claim 1, wherein any row of the display array further has at least one-row pre-charging duration before displaying, and the at least one-row pre-charging duration before displaying is before the two-row charging duration for a same row.

8. The display driving method according to claim 1, wherein the first row of the display array has a one-row charging duration or the two-row charging duration before displaying, wherein the first row of the display array displays after being charged for one-row duration according to real data corresponding to a next row of the first row.

9. A display driving device, comprising: a first driver and a second driver, wherein the first driver is configured to: when displaying an odd-numbered frame, provide first parity row data of the odd-numbered frame to a display array, and when displaying an even-numbered frame, provide second parity row data of the even-numbered frame to the display array;

the second driver is configured to: when displaying the odd-numbered frame, enable a third parity row of the display array to be displayed based on real data of the first parity row data and enable a fourth parity row of the display array to be displayed based on interpolation data of the first parity row data; and when displaying the even-numbered frame, enable the fourth parity row of the display array to be displayed based on real data of the second parity row data and enable the third parity row of the display array to be displayed based on interpolation data of the second parity row data;

the first driver and the second driver are further configured to: enable any row of the display array except a first row have a two-row charging duration before displaying; in a case where the any row of the display array displays based on real data, enable the two-row charging duration of the any row to be used to charge the any row according to the real data corresponding to the any row; in a case where the any row of the display array displays based on interpolation data, enable a next-row charging duration of the two-row charging duration of the any row to be used to charge the any row according to real data corresponding to an adjacent row of the any row and enable a previous-row charging duration of the two-row charging duration of the any row to be used to charge the any row according to real data corresponding to another adjacent row of the any row or be not used to charge the any row;

the first parity row data is one of odd-numbered row data and even-numbered row data, and the second parity row data is the other of the odd-numbered row data and the even-numbered row data;

the third parity row is one of an odd-numbered row except the first row and an even-numbered row, and the fourth parity row is the other of the odd-numbered row and the even-numbered row;

wherein the first driver is further configured to: when displaying a plurality of frames, periodically change a data polarity of each frame, wherein the data polarity comprises a first polarity and a second polarity, and the first polarity is opposite to the second polarity;

wherein the second driver is further configured to: when displaying the plurality of frames, periodically change a data mapping relationship of each frame, so that within a minimum common period of the data polarity and the data mapping relationship of each frame, each type of data mapping relationship corresponds to both the first polarity and the second polarity;

wherein the data mapping relationship comprises at least one selected from a group consisting of a first data mapping relationship, a second data mapping relationship, a third data mapping relationship, and a fourth data mapping relationship;

the first data mapping relationship comprises: odd-numbered rows of the display array correspondingly displaying real data of odd-numbered row data of one frame, and even-numbered rows of the display array correspondingly displaying interpolation data of the odd-numbered row data of the one frame;

the second data mapping relationship comprises: odd-numbered rows of the display array correspondingly displaying real data of even-numbered row data of one frame, and even-numbered rows of the display array correspondingly displaying interpolation data of the even-numbered row data of the one frame;

the third data mapping relationship comprises: even-numbered rows of the display array correspondingly displaying real data of odd-numbered row data of one frame, and odd-numbered rows of the display array correspondingly displaying interpolation data of the odd-numbered row data of the one frame; and the fourth data mapping relationship comprises: even-numbered rows of the display array correspondingly displaying real data of even-numbered row data of one frame, and odd-numbered rows of the display array correspondingly displaying interpolation data of the even-numbered row data of the one frame.

10. The display driving device according to claim 9, wherein a first minimum change period of the data polarity of each frame is 4n frames, and n is a positive integer greater than or equal to 1; and in the first minimum change period, data polarities of n odd-numbered frame(s) and n even-numbered frame(s) are the first polarity, and data polarities of remaining n odd-numbered frame(s) and remaining n even-numbered frame(s) are the second polarity.

11. The display driving device according to claim 9, wherein in the minimum common period, a count of data mapping relationships, corresponding to the first polarity, is equal to a count of data mapping relationships, corresponding to the second polarity.

12. The display driving device according to claim 9, wherein a second minimum change period of each frame of data mapping relationship is 4 frames, the first driver is configured to: when displaying an (x1)-th frame in the second minimum change period, provide odd-numbered row data of the (x1)-th frame to the display array; when displaying an (x2)-th frame in the second minimum change period, provide even-numbered row data of the (x2)-th frame to the display array; when displaying an (x3)-th frame in the second minimum change period, provide odd-numbered row data of the (x3)-th frame to the display array; when displaying an (x4)-th frame in the second minimum change period, provide even-numbered row data of the (x4)-th frame to the display array; and the second driver is configured to: when displaying the (x1)-th frame in the second minimum change period, enable the display array to be displayed according to the first data mapping relationship; when displaying the (x2)-th frame in the second minimum change period, enable the display array to be displayed according to the second data mapping relationship; when displaying the (x3)-th frame in the second minimum change period, enable the display array to be displayed according to the third data mapping relationship; when displaying the (x4)-th frame in the second minimum change period, enable the display array to be displayed according to the fourth data mapping relationship, wherein a group {x1, x2, x3, x4} is identical to a group {1, 2, 3, 4}.

13. The display driving device according to claim 9, wherein the second driver is further configured to: enable any row of the display array to have at least one-row pre-charging duration before displaying; and the at least one-row pre-charging duration before displaying is before the two-row charging duration for a same row.

14. A display device, comprising: a display driving device, wherein the display driving device comprises a first driver and a second driver, wherein the first driver is configured to: when displaying an odd-numbered frame, provide first parity row data of the odd-numbered frame to a display array, and when displaying an even-numbered frame, provide second parity row data of the even-numbered frame to the display array;

the second driver is configured to: when displaying the odd-numbered frame, enable a third parity row of the display array to be displayed based on real data of the first parity row data and enable a fourth parity row of the display array to be displayed based on interpolation data of the first parity row data; and when displaying the even-numbered frame, enable the fourth parity row of the display array to be displayed based on real data of the second parity row data and enable the third parity row of the display array to be displayed based on interpolation data of the second parity row data;

the first driver and the second driver are further configured to: enable any row of the display array except a first row have a two-row charging duration before displaying; in a case where the any row of the display array displays based on real data, enable the two-row charging duration of the any row to be used to charge the any row according to the real data corresponding to the any row; in a case where the any row of the display array displays based on interpolation data, enable a next-row charging duration of the two-row charging duration of the any row to be used to charge the any row according to real data corresponding to an adjacent row of the any row and enable a previous-row charging duration of the two-row charging duration of the any row to be used to charge the any row according to real data corresponding to another adjacent row of the any row or be not used to charge the any row;

the first parity row data is one of odd-numbered row data and even-numbered row data, and the second parity row data is the other of the odd-numbered row data and the even-numbered row data;

the third parity row is one of an odd-numbered row except the first row and an even-numbered row, and the fourth parity row is the other of the odd-numbered row and the even-numbered row;

the first driver is further configured to: when displaying a plurality of frames, periodically change a data polarity of each frame, wherein the data polarity comprises a first polarity and a second polarity, and the first polarity is opposite to the second polarity;

wherein the second driver is further configured to: when displaying the plurality of frames, periodically change a data mapping relationship of each frame, so that within a minimum common period of the data polarity and the data mapping relationship of each frame, each type of data mapping relationship corresponds to both the first polarity and the second polarity;

wherein the data mapping relationship comprises at least one selected from a group consisting of a first data mapping relationship, a second data mapping relationship, a third data mapping relationship, and a fourth data mapping relationship;

the first data mapping relationship comprises: odd-numbered rows of the display array correspondingly displaying real data of odd-numbered row data of one frame, and even-numbered rows of the display array correspondingly displaying interpolation data of the odd-numbered row data of the one frame;

the second data mapping relationship comprises: odd-numbered rows of the display array correspondingly displaying real data of even-numbered row data of one frame, and even-numbered rows of the display array correspondingly displaying interpolation data of the even-numbered row data of the one frame;

the third data mapping relationship comprises: even-numbered rows of the display array correspondingly displaying real data of odd-numbered row data of one frame, and odd-numbered rows of the display array correspondingly displaying interpolation data of the odd-numbered row data of the one frame; and the fourth data mapping relationship comprises: even-numbered rows of the display array correspondingly displaying real data of even-numbered row data of one frame, and odd-numbered rows of the display array correspondingly displaying interpolation data of the even-numbered row data of the one frame.

* * * * *